United States Patent [19]

Egami et al.

[11] Patent Number: 4,620,139
[45] Date of Patent: Oct. 28, 1986

[54] BRUSHLESS D.C. MOTOR

[75] Inventors: Kazuhito Egami, Tokyo; Norimitsu Hirano, Kanagawa, both of Japan

[73] Assignee: Kabushiki Kaisha Shicoh Giken, Kanagawa, Japan

[21] Appl. No.: 757,172

[22] Filed: Jul. 22, 1985

[51] Int. Cl.$^4$ ............................................ H02K 29/08
[52] U.S. Cl. .................................... 318/254; 318/138; 310/62; 310/68 R
[58] Field of Search ................. 318/138, 254 A, 254, 318/439; 310/62, 63, 67 R, 68 R, 156, 268

[56] References Cited

U.S. PATENT DOCUMENTS

| | | | |
|---|---|---|---|
| 4,164,690 | 8/1979 | Muller et al. | 318/254 A X |
| 4,256,997 | 3/1981 | Brusaglino et al. | 318/254 |
| 4,496,887 | 1/1985 | Ichihara et al. | 318/254 |
| 4,499,407 | 2/1985 | Macleod | 318/254 |
| 4,504,751 | 3/1985 | Meier | 310/63 X |

FOREIGN PATENT DOCUMENTS 55-166473 12/1980 Japan ..................................... 318/254
58-123360 7/1983 Japan ..................................... 318/254

Primary Examiner—Vit W. Miska
Assistant Examiner—Bentsu Ro
Attorney, Agent, or Firm—Walter & Shannon Ziems

[57] ABSTRACT

A brushless d.c. motor is equipped with a stator armature, which is composed of a stator yoke and at least one armature coil arranged on the stator yoke, and a 2p(p: a positive integer of 1 or more)-pole magnetic rotor facing the stator armature, rotatable relative to the stator armature and having alternating N and S poles. The motor can self-start by utilizing a cogging torque produced upon feeding a direct current to a position sensor. The stator yoke defines at such a point as permitting self-starting of the magnet rotor a cut-off portion of such a shape that ensures the self-starting of the magnet rotor and provides an ideal composite torque curve. The brushless d.c. motor enjoys easy assembly work, low manufacturing cost, compact size, good performance, good mass productivity, etc. It is suited particularly as a disk-type brushless motor or disk-type burshless fan motor.

4 Claims, 17 Drawing Figures

BRUSHLESS D.C. MOTOR

BACKGROUND OF THE INVENTION (1) Field of the Invention

This invention relates to a brushless d.c. motor with one position sensor, particularly to a brushless d.c. motor having one position sensor and useful for use as a thin disk-shaped brushless d.c. fan motor (i.e., brushless d.c. axial-flow fan). The term "d.c." as used herein should be interpreted in such a broader sense that it covers not only direct currents (d.c.) but also single-phase currents. For the sake of simplification, the invention will hereinafter be described using "d.c." only.

(2) Description of the Prior Art

Reflecting the development of a variety of apparatus in recent years, there is a strong demand for brushless motors suitable for such apparatus, especially, brushless d.c. motors. Since such brushless d.c. motors are also useful as brushless fan motors for office machines, there is a demand, depending on machines to be incorporated therein, toward brushless fan motors which are extremely economical, small, extremely-thin and flattened, and light, apart from efficiency of rotation (needless to say, they would be useless unless they have efficiencies of rotation above a certain level).

Use of a conventional brushless motor for the construction of brushless fan motor is however difficult to provide a disk-shaped brushless d.c. fan motor having a thickness as small as 10–15 mm, because such a conventional brushless motor is of the cylindrical and core-equipped type and electrical parts for its drive circuit, including a position sensor, must also be assembled in the brushless motor. Owing to the core-equipped nature of the brushless motor, it is inherently heavy and cannot thus be constructed into any model having an extremely light weight. These brushless fan motors were thus accompanied by such drawbacks that certain types of housings did not permit their incorporation and otherwise needed some changes to their designs. Due to their core-equipped structures, they were formed of many parts and they required expensive equipment for winding armature coils on cores. In addition to these shortcomings, they were not able to provide excellent productivity.

As a brushless motor capable of satisfying the above-mentioned requirements to a highest possible degree, a disk-shaped brushless and coreless d.c. motor having one armature coil and one position sensor may then be contemplated. Such a disk-shaped brushless d.c. motor cannot however be caused to rotate continuously unless certain special means is applied thereto, although it may be possible to rotate its rotor magnet over a certain predetermined range. Therefore, it was not able to make up any disk-shaped brushless motor. Even if a motor equipped with only one armature coil and position sensor should be able to rotate, it is unexpectable to obtain any large rotary force with such a single piece of armature coil. For large rotary forces, it is indispensable to use two or more armature coils.

When designing, for example, a disk-shaped brushless motor having two armature coils as stator armatures, it has conventionally been necessary to use two position sensors. Namely, it has been required, for permitting continuous rotation, to design such a disk-shaped brushless motor into two-phase disk-shaped brushless motor which require two position sensor. Magnetoelectric transducers such as Hall elements or Hall IC devices are often used as position sensors. These position sensors are however costly. It is certainly preferred from the viewpoint of mass production of economical, small and disk-shaped brushless motors, especially, disk-shaped brushless fan motors if each of such motors can be constructed with a single piece of position sensor.

However, use of a single piece of position sensor is accompanied by such a problem that similar to the above-mentioned motor with a single piece of coil, the resultant motor cannot start by itself when the position sensor detects the boundary area between an N pole and its matching S pole of the rotor magnet (i.e., field magnet), namely, the dead point at the time of its start. Namely, the torque of a brushless d.c. motor reaches zero at points where the current is switched over. In other words, the brushless d.c. motor contains so-called "dead points", which lead to the drawback that the motor cannot start by itself when the rotor is located by chance at either one of such dead points at the time of its start.

In the case of a disk-shaped brushless d.c. motor, it is therefore allowed to overcome such dead points and to make a self-start even with a single piece of position sensor by applying a torque (cogging torque) from a cogging-generating magnetic member (an iron piece is used) in addition to torques produced by its armature coils and rotor magnet.

As an exemplary method for applying a cogging torque in a brushless motor of the coreless type, it may be possible to dispose iron members, which produce cogging torques, within the air gap of a space magnetic field as shown in FIG. 13 or to form tilted projections on a stator yoke as illustrated in FIG. 14. In FIGS. 13 and 14, there are depicted rotor yokes 50, 6-pole magnet rotors 51 with alternating N and S magnetic poles, air-core type armature coils 52, air gaps 53, stator yokes 54 and iron rods 55. As a method for applying cogging in a coreless motor, the iron rod 55 may be inserted partly in the air gap 53 having a constant width as shown in FIG. 13. According to this method, a magnetic flux 56 is produced as depicted in FIG. 15, whereby causing the magnet rotor 51 to stop at a point where the center of the N or S magnetic pole of the rotor magnet 51 confronts the iron rod 55. Thus, a self-starting brushless motor of the coreless type can be obtained provided that the armature coils 52 are arranged at such points as permitting the production of rotary torques at such a stopped point. The method shown in FIG. 13 is however accompanied by such a drawback that if the thickness of each iron rod 55 is increased to make the cogging torque greater, the magnetic flux 56 is applied in the vicinity of the dead point as depicted in FIG. 16 and the torque is thus lowered near the dead point. This method also requires many parts, thereby making the assembly work difficult. Besides, unless optimum members are chosen as the iron members, it is impossible to obtain an ideal composite torque curve which is in turn obtained from ideal cogging torques and ideal armature coil torques. On the other hand, it has also been known to make the air gap 54 of the space magnetic field tilted as shown in FIG. 14. This method is however accompanied by such drawbacks that the magnetic flux density is lowered, large rotary torques cannot be obtained and the efficiency is hence lowered since the width of the air gap of the space magnetic field increases. In addition, both of the above methods require such a structure that the stator yoke is provided uniformly in the entire plane which lies in opposition to the magnet rotor. Due to the provision of this stator yoke, there is no space sufficient for easy arrangement of the position sensor and electrical parts. It was therefore not possible to construct with ease a brushless d.c. motor, disk-shaped brushless d.c. motor or especially a disk-shaped brushless d.c. fan motor, which had a thickness as small as 10–15 mm. Particularly when transistors, resistors, etc. are used as electrical parts, they may be put together into a compact form if a chip-type part is employed. Such chip-type parts are however expensive. For models requiring low manufacturing costs, transistors and the like must be relied upon in spite of their large sizes. Use of IC devices as drive circuits results in compact electrical parts. However, it is necessary to use very expensive facilities to obtain IC devices which are commonly applicable to various models. It was thus tried to use commercially-available IC devices. However, such commercial IC devices were not applicable to some models due to their shapes, sizes, etc. These are drawbacks of IC devices.

In order to obtain an ideal torque-turning angle curve, it is indispensable to obtain such a composite torque curve 57 as shown in FIG. 17. Numeral 58 indicates an armature coil torque curve obtained by an armature coil. Designated at numeral 59 is a cogging torque curve obtained by a cogging-producing magnetic member. As apparent from the armature coil torque curve 58 and cogging torque curve 59, it is necessary to make the magnitude of the cogging torque one half of that of the armature torque. In this manner, it is possible to obtain, as a combination of the armature coil torque and cogging torque, the composite torque curve 57 which is substantially constant over the entire range of the turning angle. It is therefore necessary to design a self-starting brushless d.c. motor in such a way that such an ideal composite torque curve as that 57 illustrated in FIG. 17 is obtained.

Although the above description has been made primarily with respect to disk-shaped brushless d.c. motors, the same description also applies equally to cylindrical brushless d.c. motors.

SUMMARY OF THE INVENTION

With the foregoing in view, the present invention has as one of its objects the provision of a brushless d.c. motor with one position sensor and one or more armature coils, which can start by itself with the single piece of position sensor, is economical, extremely light weight and very efficient, and provides a good composite torque curve. Another object of this invention is to provide a disk-shaped, brushless d.c. motor or disk-shaped, brushless d.c. fan motor having an extremely small thickness, a superlight weight and a small size and equipped with a position sensor and electrical drive circuit parts rationally built therein.

In one aspect of this invention, there is thus provided a brushless d.c. motor equipped with a stator armature, which is composed of a stator yoke and at least one armature coil arranged on the stator yoke, and a 2p(p: a positive integer of 1 or more)-pole rotor magnet facing the stator armature, rotatable relative to the stator armature and having alternating N and S poles, said motor being capable of self-starting by utilizing a cogging torque produced upon feeding a direct current to a position sensor, wherein the stator yoke defines at such a point as permitting self-starting of the rotor magnet a cut-off portion of such a shape that ensures the self-starting of the rotor magnet and provides an ideal composite torque curve.

The provision of the cut-off portion in the stator yoke permits production of a cogging force, whereby making it possible, even with the single piece of position sensor, to always move the rotor magnet from the dead point to a point, where the rotor magnet can start turning whenever stopped or started, and to stop the rotor magnet there. By disposing the necessary electrical parts such as position sensor and the like within the above-described cut-off portion, the stator yoke is prevented from interfering with the assembly of such electrical parts. In this manner, the electrical parts making up the drive circuit is rationally built in the brushless d.c. motor. The present invention has thus brought about a brushless d.c. motor having good efficiency and characteristics, capable of providing an ideal composite torque curve, and requiring a low manufacturing cost. By forming the brushless d.c. motor of this invention into a disk-type, brushless d.c. motor of the coreless type, it may be obtained with a superlight weight and a superflattened shape.

The above and other object, features and advantages of the present invention will become apparent from the following description and the appended claims, taken in conjunction with the accompanying drawings.

BRIEF DESCRIPTION OF THE INVENTION

DETAILED DESCRIPTION OF THE INVENTION AND PREFERRED EMBODIMENTS

Referring first to FIGS. 1 to 6, a disk-type brushless fan motor incorporating the disk-type brushless (semiconductor) motor of the coreless type according to the first embodiment of this invention will be described. The motor of the first embodiment includes one position sensor and two armature coils and is powered by a direct current, the rotor magnet of which has four poles. The motor can be driven under the same principle even if it has only one armature coil.

Figure 1:
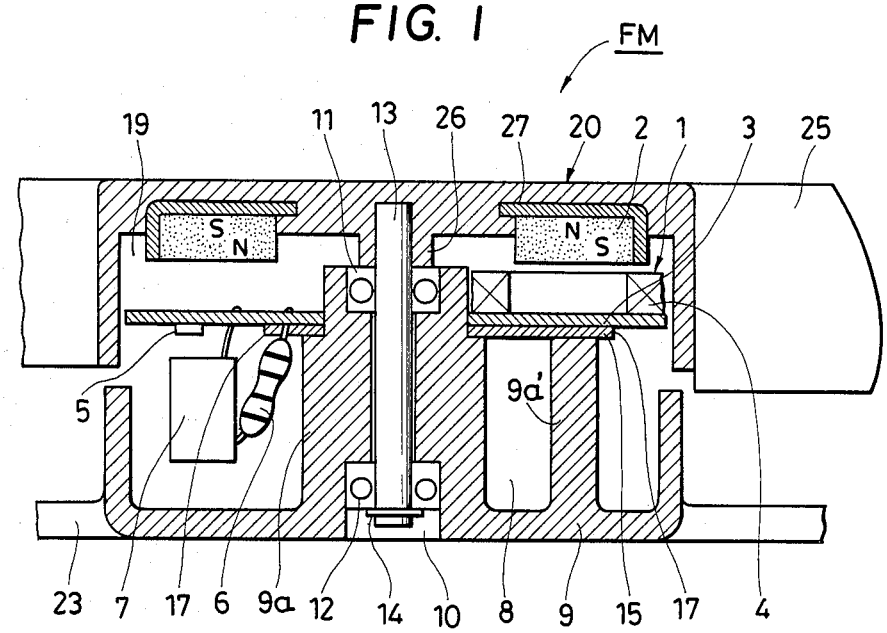
FIG. 1 is fragmentary vertical cross-sectional view of a disk-type brushless fan motor according to one embodiment of this invention.

Numeral 8 indicates a space. Electrical parts of a power control circuit may be built in by making use of the space 8. This permits easy and mass production, thereby allowing to provide low-cost, good-performance, disk-type brushless motors and disk-type brushless fan motors. In the embodiment illustrated in FIG. 1, the space 8 has a substantial height (which extends in the vertical direction as seen in FIG. 1). This substantial height has been designed in view of large electrical parts. When small electrical parts such as chip-type parts or an IC device is used instead, it may be possible to reduce the height of the space 8 by making a support 9a', which will be described herein, shorter or without providing the support 9a', to fix a stator yoke 15, which will also be described herein, directly on the inner wall of a motor housing 9, for example, by adhering the former to the latter. In the latter case, it is still more convenient to provide the above-mentioned electrical parts and a below-described position sensor 5 on a lower surface area of a printed circuit 3 which area has been exposed owing to the formation of a below-described cut-off portion 17 or on the upper surface of the printed circuit 3, because such an arrangement can provide a still thinner, disk-type motor.

Figure 2:
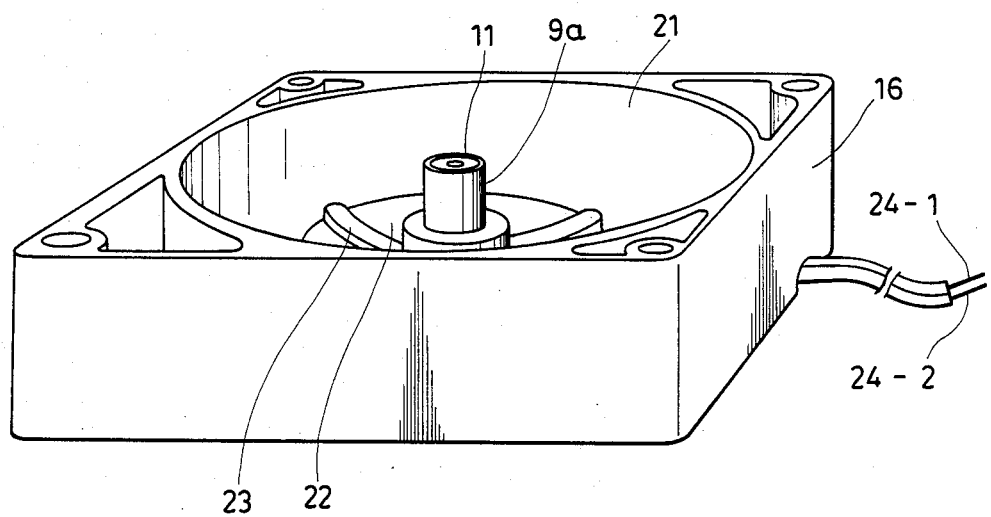
FIG. 2 is a perspective view of a housing of the fan motor shown in FIG. 1.
Figure 3:
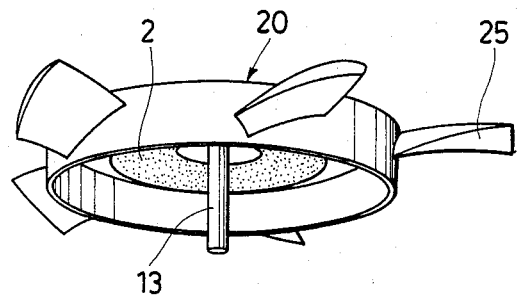
FIG. 3 is a perspective view of a fan-equipped cup member depicted in FIG. 1.

The cup-like housing 9 for the disk-type motor, which housing is flattened in the direction of the axis of a below-described rotary shaft 13 of the motor and made for example of a magnetic material, plastic or the like, has a cylindrical bearing holder 9a which extends upward. The cylindrical bearing holder 9a centrally defines a central through-hole 10. Journal bearings 11,12 are provided respectively in upper and lower end pockets formed in the inner wall of the through-hole 10. By the journal bearings 11,12, the rotary shaft 13 is rotatably supported substantially along the central axis of the housing 9 for the disk-type brushless fan motor. On a lower part of the rotary shaft 13, an E-ring 14 is fit for preventing the rotary shaft 13 from slipping off. The motor housing 9 is mounted centrally in a hollow space 21 of a square-shaped case 16 for the disk-type brushless fan motor. The case 16 is illustrated in FIG. 2. When the motor housing 9 has been mounted in the hollow space 21, fans 25 which will be described herein are allowed to assume their positions in the space defined by the outer peripheral wall of the motor housing 9 and the inner circumferential wall of the square-shaped case 16. In FIG. 2, there are illustrated an air intake opening 22 and spokes 23, both of which are formed in the bottom wall of the case 16; a positive power supply line 24-1 and a negative power supply line 24-2.

Figure 4:
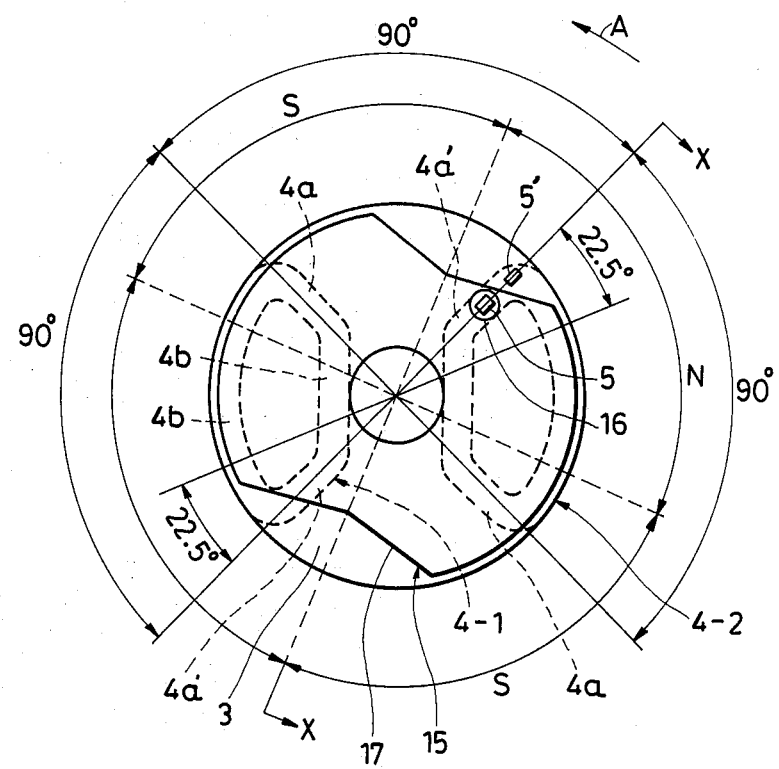
FIG. 4 is a schematic illustration showing the positional relation among a stator yoke, a group of armature coils and a 4-pole rotor magnet while the rotor is stopped in the first embodiment.
Figure 5:
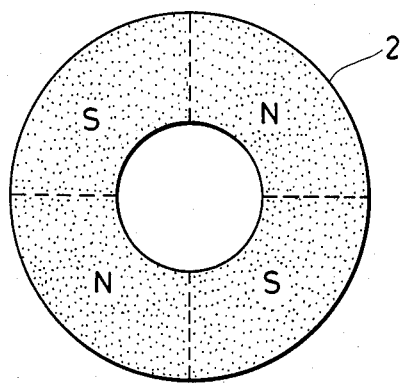
FIG. 5 is a bottom plan view of a 4-pole, annular rotor magnet.

On the top of the support 9a' provided with the motor housing 9 (another support 9a' is also provided at a point symmetrical by 180 degrees to the support 9a' although it is not illustrated in FIG. 1), a stator yoke 15 which will later be described in further detail with reference to FIG. 4 is fixedly secured together with the printed circuit 3 by means of unillustrated non-magnetic screws or the like. For example, the stator yoke 15 and printed circuit 3 can be fixedly secured by boring, therethrough, holes through which the non-magnetic screws are caused to extend. Such through-holes are however omitted in FIG. 1. Use of stator yokes, which have been obtained by molding iron powder and plastic powder as their principal raw materials, as the stator yoke 15 allows to achieve advantageous mass production of brushless motors of this invention. Such stator yokes are also advantageous in providing brushless motors having performance. A special magnetic material composed of such raw materials has such merits that it is easy to machine, has a sufficient permeability although not so high as iron-base materials, and does not develop too much core loss. It is thus desirable to form the stator yoke 15 with such a special magnetic material. As depicted in FIG. 4, the armature coils 4-1,4-2 are arranged on the printed circuit 3, which is in turn disposed on the upper wall of the stator yoke 15, at positions symmetrical to each other by 180 degrees so that they assume in-phase positions. The stator armature 1 is composed by the two armature coils 4-1,4-2 and the printed circuit 3. The armature coils 4-1,4-2 are air-core type coils and the stator armature 1 is thus a coreless armature. Above the upper wall of the stator yoke 15, there is arranged a fan-equipped cup member (rotary fan) 20 with the inner bottom wall thereof facing the upper wall of the stator yoke 15. The fan-equipped cup member 20 is flattened in the axial direction and is made of a plastic material. Designated at numeral 25 are fans formed as integral members on the outer side wall of the cup member 20. On substantially the central part of the inner wall of the cup member 20, there is integrally formed a boss 26 in which an upper end portion of the rotary shaft 13 is fixedly received so that the cup member 20 rotates together with the rotary shaft 13. On the inner top wall of the cup member 20, an annular magnetic yoke (rotor yoke) 27 is attached fixedly. On the lower surface of the magnetic yoke 27, a 4-pole rotor magnet 2 having alternating N and S magnetic poles as depicted in FIG. 5 is secured fixedly. Thus, the rotor magnet 2 is disposed in a face-to-face relation with the stator armature 1. On the upper surface of the printed circuit 3 which surface confronts the rotor magnet 2 and is opposite to the stator yoke 15, there are arranged the two sector-like armature coils 4-1,4-2 at positions symmetrical by 180 degree to each other as mentioned above so that the armature coils 4-1,4-2 do not overlap each other. As illustrated in FIG. 4, each of the armature coils 4-1,4-2 has been formed by winding a wire on conductor portions 4a,4a' which contribute to the generation of torques and extend with an opening angle substantially equal to the width of each magnetic pole of the rotor magnet 2. The lower surface of the printed circuit 3 is exposed owing to the formation of the cut-off portion 17 in the stator yoke 15. On the thus-exposed lower surface of the printed circuit 3, there are arranged, as shown in FIG. 1, the electrical parts (transistor) 7, resistor 6 and the like which make up the power control circuit (drive circuit). In this manner, the electrical parts 7,6 can be rationally received and provided in the space 8 which is sufficiently large. Moreover, it is possible to allow the leads of the electrical parts 7,6 to extend over the upper surface of the printed circuit 3 owing to the provision of the cut-off portion 17. Therefore, the leads of the electrical parts 7,6 can be soldered to the upper surface of the printed circuit 3. In addition, it is possible to provide with ease the electrical parts 7,6 upside down on the lower surface of the printed circuit 3 as depicted in FIG. 1. Therefore, unlike such an arrangement as illustrated in FIG. 2 of Japanese U.M. Laid-open No. 153579/1983 for example, it is unnecessary to perform such cumbersome work that the electrical parts 7,6 have to be arranged by laying them down on the printed circuit 3, on which the armature coils 4-1,4-2 have already been disposed, at a small area unoccupied by the armature coils 4-1,4-2. By the way, arcuate conductor portions 4b of the armature coils 4-1,4-2 do not contribute to the generation of torques. Accordingly, rotor magnets having radii smaller by the widths of the conductor portions 4b may be conveniently used as the rotor magnets 2. Since 4-pole magnet rotors are used as the rotor magnets 2, the armature coils 4-1,4-2 are formed into sectorial armature coils in each of which the opening angle between the conductor portions 4a and 4a', which contribute to the generation of torques, is 90 degrees. It is desirable from the positional viewpoint to arrange the position sensor 5, which is constructed of a magnetoresistor such as a Hall element or Hall IC device, on the conductor portion 4a or 4a' which contributes to the generation of torques. This arrangement however results in a thickness increase by the thickness of the position sensor 5. The air gap between the rotor magnet 2 and the armature coils 4-1,4-2 is increased, thereby making it impossible to obtain large torques. Furthermore, the above arrangement is very irksome in providing the position sensor 5 and is hence not suited for mass production. Accordingly, the position sensor 5 is arranged at a position opposite to the conductor portion 4a' (alternatively, the conductor portion 4a) in the present embodiment. For this purpose, it is preferred to form a through-hole 16 in the stator yoke 15 at a point facing the conductor portion 4a', which contributes to the generation of torques, of the armature coil 4-2 (alternative, 4-1) and then to put the position sensor 5 in the through-hole 16, as shown in FIG. 4. In view of the provision of the cut-off portion 17, it is desirable to arrange the position sensor 5 on the printed circuit 3 at a position exposed by the cut-off portion 17 as depicted in FIG. 7. As indicated by numeral 5' in FIG. 4, it is thus particularly preferred to arrange the position sensor 5' on the upper (or lower) surface of the printed circuit 3 at a position confronting the conductor portion 4a', which contributes to the generation of torques, of the armature coil 4-2 and exposed by the cut-off portions 17. It is to minimize vibrations due to rotation that the two armature coils 4-1,4-2 are arranged symmetrically as shown in FIG. 4. Either one of the armature coils may thus be omitted. The stator yoke 15 defines, as shown in FIG. 4, the cut-off portions 17 of such a shape that areas facing desired N and S magnetic poles of the rotor magnet 2 are substantially equal to each other. By forming such cut-off portions 17, the N or S magnetic poles of the rotor magnet 2 are positioned, at the time of a stop or start, at points approximately one-fourth (22.5° as the 4-pole rotor magnet 2 is used in this embodiment) behind the corresponding magnetic poles of the rotor magnet 2 as the rotor magnet 2 illustrated by broken lines in FIG. 6 (in the development of the rotor magnet 2 and armature coils 4-1,4-2 indicated by solid lines in FIG. 6, a case capable of producing the maximum torque is shown), normally as shown by way of example in FIG. 4 (in FIG. 4, the positions of the N poles and S poles of the rotor magnet 2 are shown in the rim to show the relation among the rotor magnet 2, stator yoke 15 having the cut-off portions 17, position sensor 5 (or 5') and armature coils 4-1,4-2 at the time of a stop or start of the rotor magnet 2). Namely, when the cut-off portions 17 are formed in the stator yoke 15 under the above-mentioned conditions, the rotor magnet 2 is stopped in such a way that the the N and S magnetic poles of the rotor magnet 2 are attracted in opposition to stator yoke portions free of the cut-off portions 17. Therefore, the position sensor 5 always detects either one of the N and S poles of the rotor magnet 2 and does not detect any of the dead points. It is hence possible to cause the rotor having the rotor magnet 2 to rotate in a predetermined direction if a current is fed in a prescribed direction through the armature coil 4-1 or 4-2. Although the formation of the cut-off portions 17 in the stator yoke 15 serves as a cause for cogging generation, the present invention makes effective utilization of the cogging produced by the stator yoke 15 having the cut-off portions 17 so as to permit continuous rotation. Since only one position sensor is thus sufficient, an economical disk-type brushless d.c. motor or fan motor can be obtained.

The cut-off portions 17 of the stator yoke 15 always allows the magnet rotor 2 to start rotating by itself. Their shapes are so determined that the position sensor 5 is allowed to rotate smoothly while producing cogging little by little until it confronts a predetermined N pole or S pole. Namely, the motor is constructed in such a way that the maximum starting torque is not obtained when a current is fed to the armature coils 4-1,4-2 but the maximum starting torque can be obtained upon an elapsed time of some period (this period is short) after feeding a current thereto. Reasons for the above construction will next be described.

Figure 6:
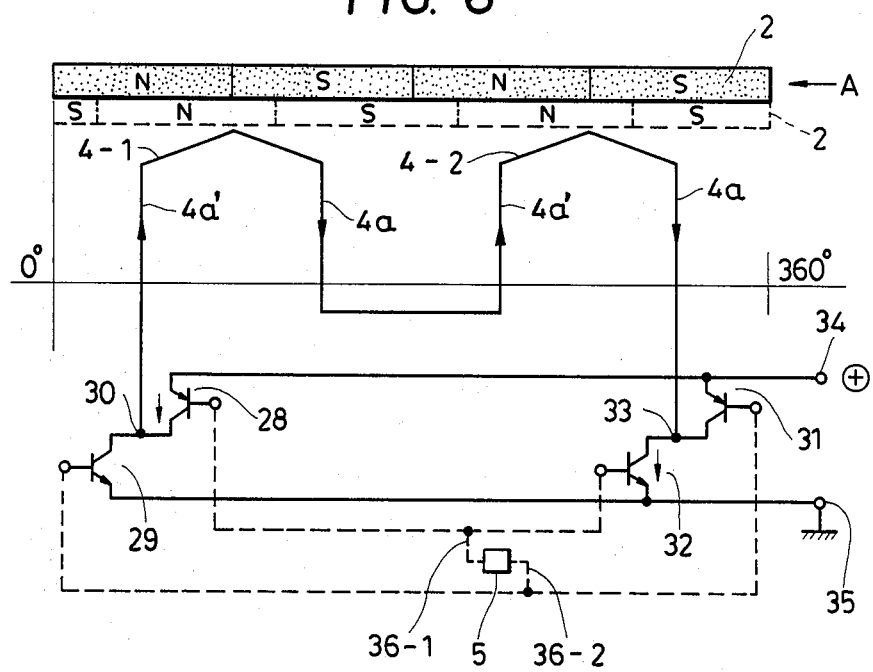
FIG. 6 is a development of a rotor magnet and a group of armature coils (stator armatures) in a 4-pole, 2-coil, brushless d.c. motor.
Figure 7:
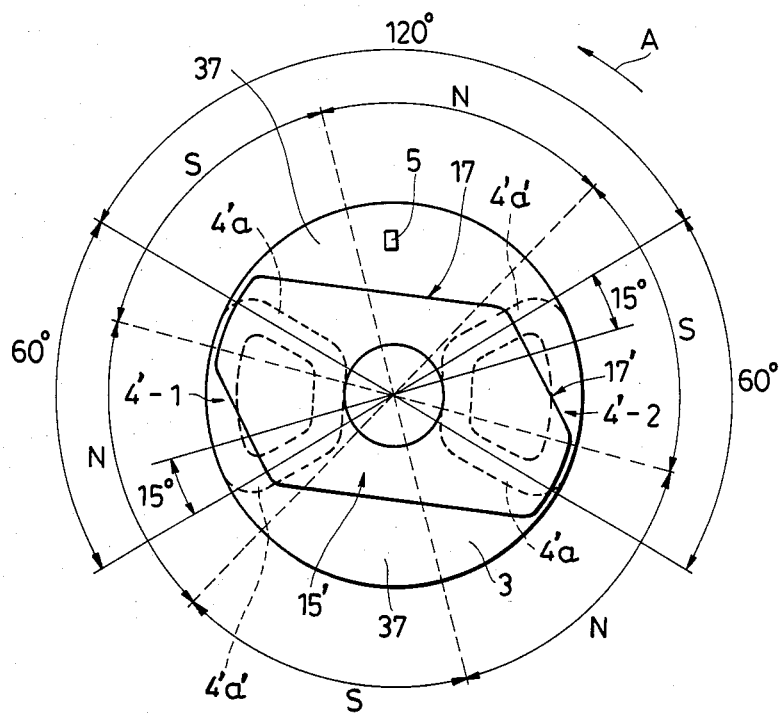
FIG. 7 is a schematic illustration showing the relation among a stator yoke, a group of armature coils and a 6-pole rotor magnet while the rotor is stopped in the second embodiment of this invention.

As illustrated in a developed form in FIG. 6, it is when the conductor portions 4a,4a', which contribute to the generation of torques, of the armature coils 4-1,4-2 assume such positions as shown in the same drawing relative to the magnet rotor 2 shown by solid lines that the maximum starting torque is produced. When the motor is started in such a state that the maximum starting torque is obtained, a large loss is produced upon starting the motor and no maximum efficiency can be obtained actually. If a motor is constructed in such a way that a maximum starting torque is obtained even by a slightest rotation of the the rotor magnet 2, it is possible to provide a disk-type brushless motor or disk-type brushless fan motor having the maximum efficiency.

FIG. 6 is the development of the rotor magnet 2 and stator armature 1 in a brushless d.c. fan motor according to one embodiment of this invention, in which the rotor magnet has four poles and two armature coils are provided. In this embodiment, the conductor portions 4a,4a', which contribute to the generation of torques, of the armature coils 4-1,4-2 are arranged with an equal interval of an electric angle of 180 degrees (in this embodiment, equivalent to 90 degrees as a mechanical angle). One of the leads of the conductor portion 4a of the armature coil 4-1, which contributes to the generation of torques, and one lead of the conductor portion 4a', which contributes to the generation of torques, of the armature coil 4-2 are connected commonly. The other terminal of the conductor portion 4a', which contributes to the generation of torques, of the armature coil 4-1 is connected to a junction point 30 between the collector of a transistor 28 and the collector of a transistor 29 in the power control circuit, while the other terminal of the conductor portion 4a, which contributes to the generation of torques, of the armature coil 4-2 is connected to a junction point 33 between the collector of a transistor 31 and the collector of the transistor 32. This power control circuit is formed in such a way that it permits single-phase reciprocal current feeding. The emitters of the transistors 28,31 are each connected to a positive power supply terminal 34, while the emitters of the transistors 29,32 are each connected to a ground 35. The output terminals 36-1, 36-2 of the position sensor 5 are connected to the power control circuit, and as illustrated in FIG. 6, when the position sensor 5 has detected one of the N poles of the rotor magnet 2, the transistors 28,32 are rendered conductive by way of the output terminal 36-1 and a current is caused to flow in a direction indicated by the arrows through the armature coils 4-1,4-2 to obtain a rotary force in the direction indicated by A. When the position sensor 5 has detected either one of the S poles of the rotor magnet 2 on the other hand, the transistors 29,32 are rendered conductive by way of the output terminal 36-2 and a current is caused to pass in a direction opposite to the above-mentioned direction through the armature coils 4-1,4-2 to obtain a rotary force in the direction indicated by A.

Figure 8:
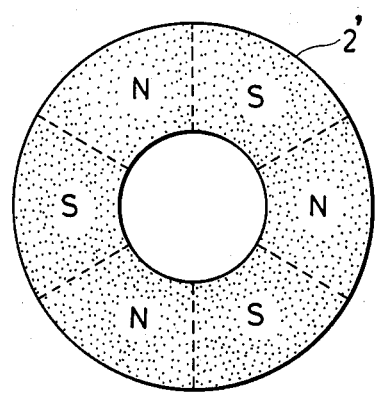
FIG. 8 is a bottom plan view of a 6-pole rotor magnet.
Figure 9:
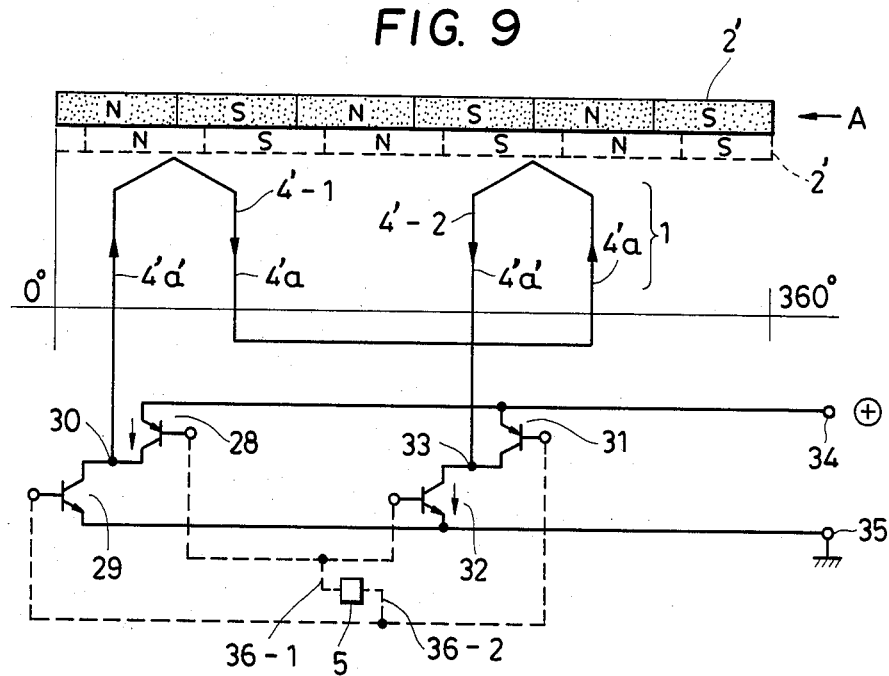
FIG. 9 is a development of a rotor magnet and a group of armature coils in a 6-pole, 2-coil, brushless d.c. motor.

With reference to FIGS. 7 through 9, the second embodiment of this invention will next be described. FIG. 7 illustrates the relation among the rotor magnet 2, armature coils 4'-1,4'-2 and stator yoke 15'. FIG. 8 is the bottom plan view of an annular rotor magnet 2'. FIG. 9 illustrates, as the development, the rotor magnet 2' and armature coils 4'-1,4'-2 in the brushless d.c. motor which includes 6 poles as poles of the rotor magnet and two armature coils. The stator yoke 15' is formed in an elongated, substantially-hexagonal shape. Additional cut-off portions 17' are also formed at corner portions of the rotor magnet 2', which corner portions are on the side of the rotating direction (i.e., in the direction indicated by the arrow A). Owing to the provision of the additional cut-off portions 17', the magnet rotor 2' produces cogging little by little so as to permit smooth rotation of the rotor magnet 2' in the direction indicated by the arrow A. The position sensor 5 is located under conditions equivalent to, namely, (in-phase) positions equal to the conductor portion 4'a and capable of contributing to the generation of torques by the armature coils 4'-1 or 4'-2, and is provided on the surface of the printed circuit 3 at a position exposed by the cut-off portion. Namely, the position sensor 5 is disposed at a specific position on the printed circuit 3, which position is located between the conductor portion 4'a, which contributes to the generation of torques, of the armature coil 4'-1 and the conductor portion 4'a', which contributes to the generation of torques, of the armature coil 4'-2 and is exposed owing to the provision of the corresponding cut-off portion 17. In the stator yoke 15' of the above-described shape, an exposed large space 37 is obtained on the surface of the printed circuit 3 owing to the formation of the cut-off portion 17. Thus, the power control circuit can be rationally, easily and conveniently received in this space 37. When the above-described structure is adopted, disk-type brushless motors or disk-type brushless fan motors can be assembled with ease. Such motors enjoy excellent mass productivity and can be manufactured at low costs.

Since the rotor magnet 2' has N and S magnetic poles, which alternate with a magnetized width of 60 degrees, and is hence formed into 6 poles, the armature coils 4'-1,4'-2 are formed into air-core type coils with sector-shaped frames each of which is composed with the conductor portions 4'a,4'a', which contribute to the generation of radial torques, opened at an angle of 60 degrees.

One of the armature coils may also be omitted in this second embodiment.

Figure 11:
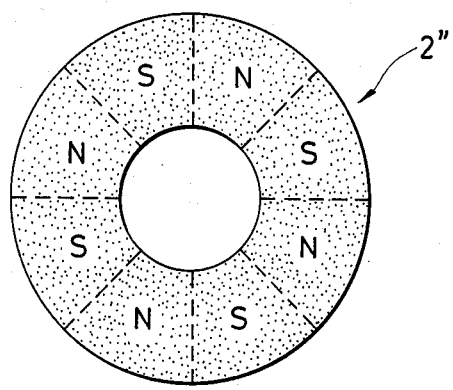
FIG. 11 is a bottom plan view of an 8-pole rotor magnet.
Figure 12:
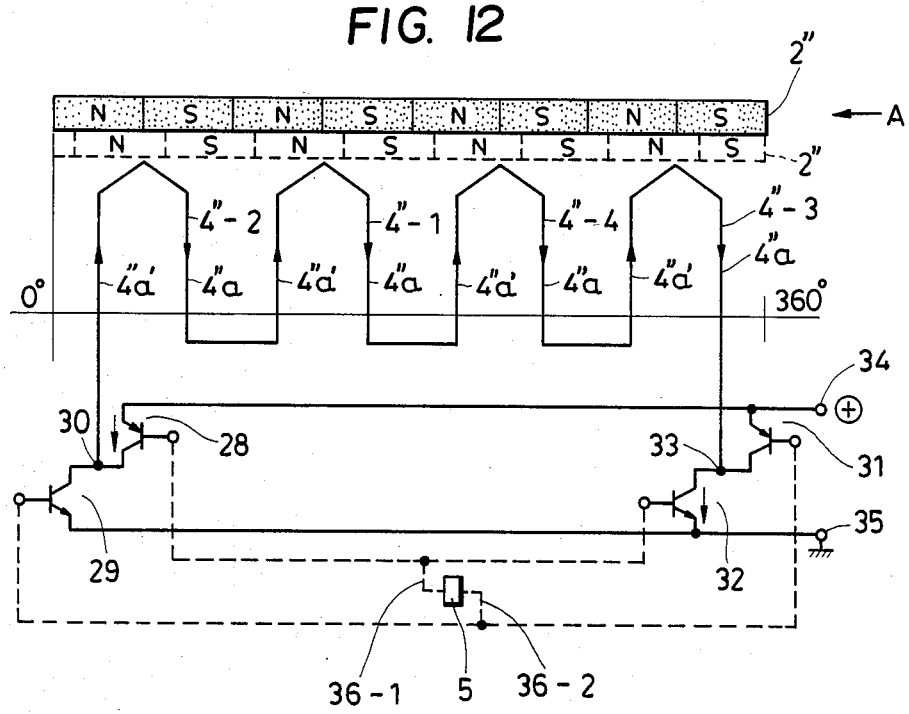
FIG. 12 is a development of a rotor magnet and a group of armature coils in a 8-pole, 4-coil, brushless d.c. motor.
Figure 13:
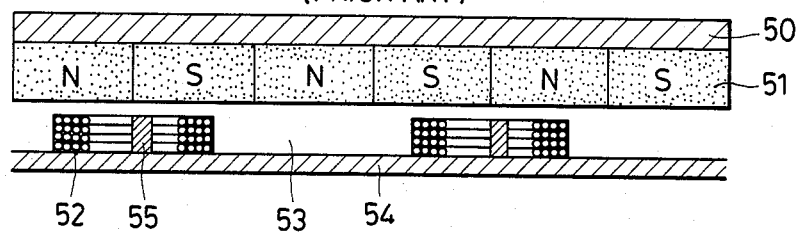
FIGS. 13 and 14 are schematic illustrations, both illustrating conventional methods for producing cogging torques in brushless d.c. motors of the coreless type.
Figure 14:
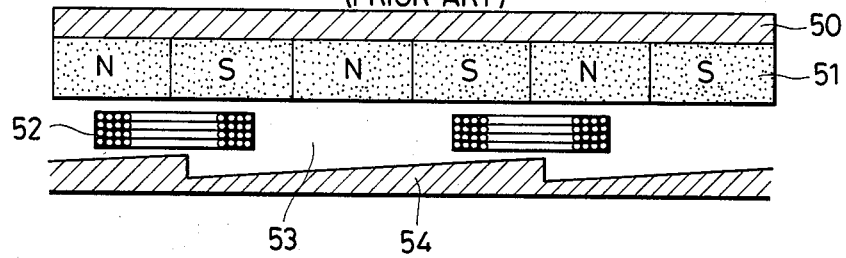
Figure 15:
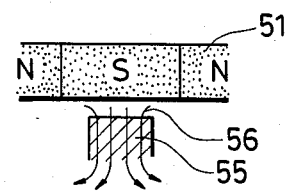
FIG. 15 is a schematic illustration showing the magnetic relation between a rotor magnet and an iron rod arranged in accordance with the method depicted in FIG. 13, in which the rotor magnetic is stopped.
Figure 16:
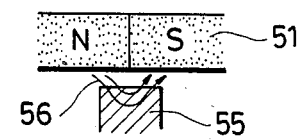
FIG. 16 is a schematic illustration showing cogging torque produced in the vicinity of dead point when the rotor magnet and iron rod are arranged in accordance with the method depicted in FIG. 13.
Figure 17:
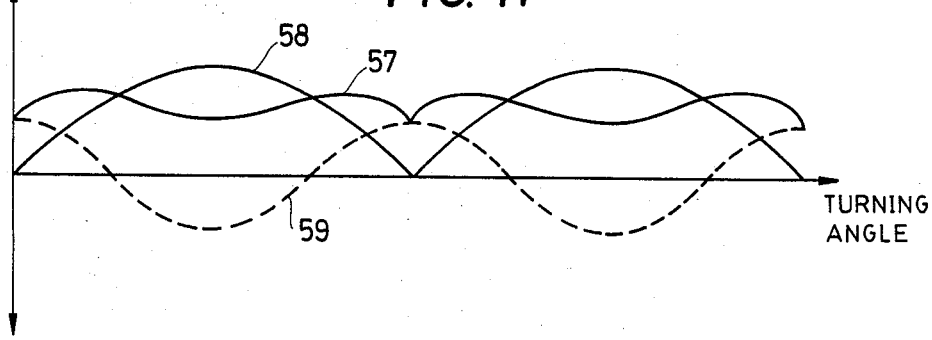
FIG. 17 is a diagram illustrating an ideal composite torque curve.

The third embodiment of this invention will next be described with reference to FIGS. 10–12, in which an 8-pole rotor magnet 2 (see, FIG. 11) and four armature coils 4"-1, . . . , 4"-4 (see, FIG. 10) are employed. A stator yoke 15" is formed in a substantially square shape, as each cut-off portion 17 has such a shape as formed by combining rationally the cut-off portions 17 and 17' shown in FIG. 7. Other shapes may also be adopted so long as the resulting stator yokes 15" meet the above-described conditions. The development of FIG. 12 is similar to that shown in FIG. 6 and its detailed description is thus omitted. In this third embodiment, the number of the armature coils may be chosen from the range of 1–4 as desired depending on the designing specification. Further, the number of the cut-off portions 17 may range from 1 to 4 as desired.

Figure 10:
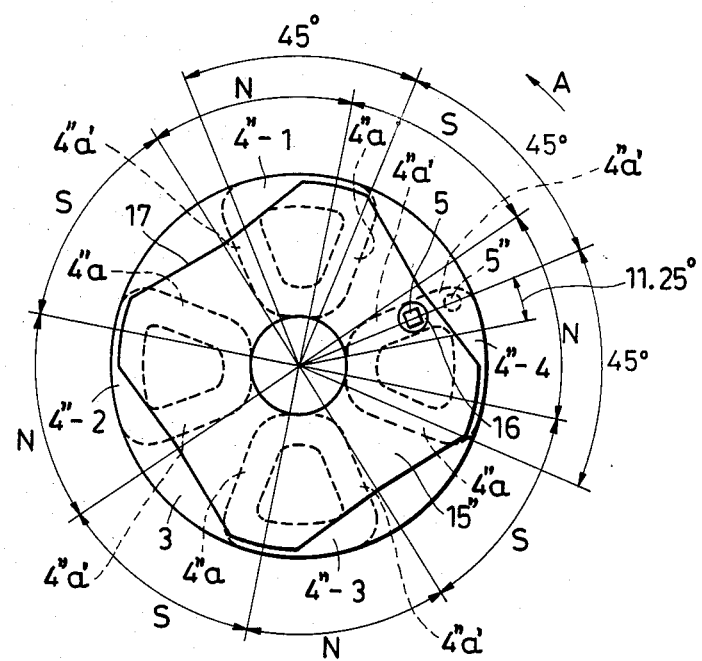
FIG. 10 is a schematic illustration showing the relation among a stator yoke, a group of armature coils and an 8-pole rotor magnet while the rotor is stopped in the third embodiment of this invention.

In the third embodiment, the position sensor 5 is arranged, similar to position sensor of the first embodiment illustrated in FIG. 4, at a position opposing to the conductor portion 4"a, which contributes to the generation of torques, of the armature coil 4"-4 as depicted in FIG. 10. In this case, the position sensor 5 may alternatively be arranged at a position opposing the stator yoke 15" as shown in FIG. 10. As indicated at numeral 5"', it is very convenient to arrange the position sensor 5 at a position opposing the conductor portion 4"a, which contributes to the generation of torques, and located on a surface area of the printed circuit 3, said surface area being exposed owing to the formation of the cut-off portion 17.

By the way, the armature coils 4"-1, . . . , 4"-4 are each formed as an air-core type coil having a sector-type frame with the conductor portions 4"a,4"a', which contribute to the generation of torques, opened at an angle of 45 degrees, because the magnet rotor 2" has 8 poles, i.e., N and S magnetic poles magnetized alternatingly with a width of 45 degrees.

In the above embodiments, the power control circuit may be composed by using a one-way power circuit and the two or more armature coils may be connected either in series or in parallel.

The above embodiments have been described with reference to disk-type brushless motors. Needless to say, the present invention may equally be applied to cup-type brushless motors.

Printed circuits were employed in the above embodiments. They may however be omitted. In this case, it will be very convenient if a substrate made of a magnetic material such as iron substrate or the like is used as a stator yoke. This substrate has an insulative layer on the surface thereof, on which a printed circuit pattern has been formed. Accordingly, it is only necessary to solder the leads of the armature coils, position sensor and electrical parts to the pattern.

As apparent form the above description, the present invention can provide a variety of low-price, high-performance brushless motors, especially, disk-type brushless motors and disk-type brushless fan motors because each of such motors requires only one position sensor and is powered by a direct current. The stator yoke defines cut-off portions so that the motor can be self-started and cogging can be produced. Owing to the cut-off portions, cogging can be produced rationally, thereby bringing about such an effect that a small disk-type brushless d.c. motor having extremely good efficiency of rotation and a simple structure and including a single piece of position sensor can be obtained. In a brushless motor, especially, disk-type brushless motor of this invention, mere formation of cut-off portions in a conventional stator yoke can provide an ideal composite torque curve of torques produced by armature coil or coils and cogging torques. Thus, a low-price, useful, brushless d.c. motor can be obtained. Owing to the formation of a cut-off portion, the brushless d.c. motor of this invention permits easy and rational arrangement of the position sensor and necessary electrical parts at a position corresponding to the cut-off portion in the main body of the motor. It is therefore possible to provide at a low cost and with ease, particularly, a disk-type brushless motor or disk-type brushless fan motor having a thickness of 10-15 mm or even smaller. Since the brushless d.c. motor of this invention is a coreless motor (however, for higher torques, an iron core may be inserted in each armature coil or an iron piece may be added to a desired position of each coreless armature), it is possible to make a brushless d.c. motor having an extremely light weight compared with conventional brushless d.c. motors. Hence, the brushless d.c. motor of this invention is very convenient not only upon is assembly in a housing but also upon its transportation.

Having now fully described the invention, it will be apparent to one of ordinary skill in the art that many changes and modifications can be made thereto without departing from the spirit or scope of the invention as set forth herein.

What is claimed is:

1. A brushless d.c. motor comprising:
   (a) a flat annular rotor magnet secured on a rotary magnetic yoke, said rotor magnet being endless and having 2p contiguous poles of alternating N and S polarity, where p is an integer of at least 1, said poles defining equal areas, having a predetermined width, of non-skewed magnetization;
   (b) a stator yoke disposed in a face-to-face relation with said rotor magnet in an axial direction;
   (c) an air-gap and a printed circuit member positioned between said rotor magnet and said stator yoke;
   (d) at least one armature coil of the air-core type arranged on said printed circuit facing said rotor magnet, said armature coil having a sectorial shape and conductor portions contributing to generation of torque, said conductor portions defining an opening angle having a width substantially equal to the width of each of said poles of said rotor magnet;
   (e) means for detecting one of the N and S poles of the rotor magnet and causing electric current to flow in a predetermined direction in said armature coil, said detecting means comprising a sole position sensor arranged along one of a said conductor portion of said armature coil and an in-phase position relative to a said conductor portion;
   (f) a power control circuit having electrical elements arranged on said printed circuit member;
   (g) means for orienting said rotary magnetic yoke such that, when no electric current is caused to flow in said armature coil, the areas of the stator yoke opposite to the N magnetic poles of the rotor magnet are substantially equal to the areas of the stator yoke opposite to the S magnetic poles of the rotor magnet, and, when no power is fed to the motor, the central axis which divides the stator yoke in two is located at a point approximately one-fourth of the width of each magnetic pole of the rotor magnet behind, relative to the direction of rotation of said rotor magnet, a point opposite to a said conductor portion of the armature coil which contributes to the generation of torque, said orienting means comprising a cut-off portion of predetermined shape in said stator yoke.

2. A brushless d.c. motor as claimed in claim 1, wherein said at least one armature coil comprises a plurality of armature coils arranged in in-phase and non-overlapping relationship with one another.

3. A brushless d.c. motor as claimed in claim 1, wherein said position sensor is provided at a position exposed by the cut-off portion.

4. A brushless d.c. motor as claimed in claim 1, wherein the brushless d.c. motor is a disk-type brushless fan motor.

* * * * *